United States Patent [19]

Soheili-Arasi et al.

[11] Patent Number: 5,684,976
[45] Date of Patent: Nov. 4, 1997

[54] METHOD AND SYSTEM FOR REDUCED ADDRESS TAGS STORAGE WITHIN A DIRECTORY HAVING A TREE-LIKE DATA STRUCTURE

[75] Inventors: Mehrdad Soheili-Arasi; Zhongru Julia Lin; Nadeem Malik; Avijit Saha, all of Austin, Tex.

[73] Assignee: International Business Machines Corporation, Armonk, N.Y.

[21] Appl. No.: 717,358

[22] Filed: Sep. 25, 1996

Related U.S. Application Data

[63] Continuation of Ser. No. 340,766, Nov. 16, 1994, abandoned.

[51] Int. Cl.$^6$ .................................................. G06F 12/08
[52] U.S. Cl. ............................................ 395/455; 395/445
[58] Field of Search ............................ 395/445, 455, 395/456

[56] References Cited

U.S. PATENT DOCUMENTS

| | | | |
|---|---|---|---|
| 3,840,862 | 10/1974 | Ready | 395/455 |
| 4,885,680 | 12/1989 | Anthony et al. | 395/471 |
| 5,025,365 | 6/1991 | Mathur et al. | 395/600 |
| 5,133,061 | 7/1992 | Melton et al. | 395/455 |
| 5,206,941 | 4/1993 | Eikill et al. | 395/469 |
| 5,257,361 | 10/1993 | Doi et al. | 395/417 |
| 5,325,503 | 6/1994 | Stevens et al. | 395/473 |
| 5,325,504 | 6/1994 | Tipley et al. | 395/455 |
| 5,467,459 | 11/1995 | Alexander et al. | 395/480 |
| 5,481,691 | 1/1996 | Day, III et al. | 395/460 |

FOREIGN PATENT DOCUMENTS

| | | |
|---|---|---|
| A-2 150 424 | 4/1973 | France . |
| WO 93 04429 | 3/1993 | WIPO . |

OTHER PUBLICATIONS

Handy, "the Cache Memory Book", 1993, pp. 14–22.

Schneider et al., "Concepts in Data Structures & Software Development", 1991, pp. 261–274 & 285–294.

Intel, "Intel 386 DX Microprocessor Hardware Reference Manual", 1991, pp. 7–3 to 7–8.

Patent Abstracts of Japan, vol. 18, No. 630 (P–1835), Nov. 30, 1994, JP–A–06 243045, Sep. 2, 1994.

Proceedings of the Annual International Symposium on Computer Architecture, Chicago, Apr. 18–21, 1994, Seznec, Andre. "Decoupled Sectored Caches: conciliating low tag implementation cost and low miss ratio," pp. 384–393.

*Primary Examiner*—Eddie P. Chan
*Assistant Examiner*—Kevin L. Ellis
*Attorney, Agent, or Firm*—Richard A. Henkler; Brian F. Russell; Andrew J. Dillon

[57] ABSTRACT

An efficient method and system within a data processing system for storing address tags are disclosed, which include a tag directory having a plurality of congruence classes, wherein each congruence class is arranged as a tree-like data structure. A portion of an address tag common to a plurality of address tags is stored in an entry within a node at a first level of a tree-like data structure corresponding to a congruence class of the directory. Portions of the plurality of address tags are stored in a node at a subsequent level of the tree-like data structure, such that all of the plurality of address tags share in common the portion stored in the entry within the node at the first level. Since a portion common to a plurality of address tags is stored only once, the memory space required to store the plurality of address tags is reduced.

10 Claims, 7 Drawing Sheets

Four 4-way associative nodes for a total of 16 4-bit tag entries

METHOD AND SYSTEM FOR REDUCED ADDRESS TAGS STORAGE WITHIN A DIRECTORY HAVING A TREE-LIKE DATA STRUCTURE

This is a continuation of application Ser. No. 08/340,766, filed Nov. 16, 1994 now abandoned.

BACKGROUND OF THE INVENTION

1. Technical Field

The present invention relates in general to an efficient method and system for directory organization and in particular to an improved method and system for storing address tags within a directory. Still more particularly, the present invention relates to an improved method and system for storing address tags within a directory by distributing address tag bits over the directory elements, thereby reducing the storage required for the address tags.

2. Description of the Related Art

A cache is a small amount of fast, expensive, zero wait state memory that is used to store a copy of frequently accessed instructions or data from main memory. When a processor operates out of a cache rather than main memory, the number of wait states that must be interposed during memory accesses is decreased. If a processor requests data from memory which resides in the cache, then a cache hit takes place, and data from the memory access can be returned to the processor from the cache without incurring wait states. However, if the requested data is not in the cache, then a cache miss takes place. After a cache miss, the requested data is retrieved from memory as if the cache did not exist. However, the data retrieved from memory is also written into the cache due to the statistical likelihood that the requested data will again be requested by the processor.

Irrespective of which type of cache organization is used, a cache requires many-to-one mapping of the large address space of main memory to the small address space of the cache. Because many memory entries can map to a single cache location, a cache directory is used to identify which of the many addresses of main memory are currently stored in the cache. Each directory entry stores a tag, a portion of the address of a cache entry used to distinguish the cache entry from other addresses which map to the same cache location. Cache directories may be organized in one of three directory schemes: direct mapped, set associative, and fully associative. Regardless of the directory scheme utilized, conventional directories store as many tags as there are total elements in the directory. Thus, most of the directory storage is allocated to storing tags, even though other bits associated with cache elements, such as valid bits, LRU bits, etc., are included in the directory. When the number of elements in a directory becomes large, the storage allocated to tag bits, and therefore the cost of the cache memory storing the directory, become large.

A similar directory storage problem arises in shared memory multiprocessor systems. In directory-based shared memory multiprocessor systems, the memory system maintains a directory entry for each memory line to track the residency and sharing state of that line in other processors. On a memory access, the directory entry is then used to selectively generate invalidates for the processors that are known to have a local copy of the data accessed. The amount of directory storage required can become quite significant because, for optimal performance, the number of entries in the directory scheme must be equal to the number of unique cache lines that can be supported in all processors within the multiprocessor system. Since the optimal directory size can be very large and thus prohibitively expensive, a directory cache is generally utilized to track only the most frequently accessed memory lines. Although cache lines have to be purged from processors if an entry in the directory cache is cast out due to a class conflict, if this conflict occurs infrequently on the average, the performance degradation is not significant. Although the required storage is greatly reduced by utilizing a directory cache, significant storage may still be required to store the cache tags.

Similarly, address tag storage is a major consideration in shared bus systems. In shared bus systems which include a greater number of processors than can be supported on a single bus, a directory similar to a cache directory is utilized as the router between two buses. The router transmits an address of a datum accessed by one processor to a second processor if the second processor has a datum cached for that address. Again, a directory cache is normally utilized to store addresses of the most frequently accessed data lines. As with the cache directory and the shared memory directory, the storage required for the router directory may be large due to the number of address tags stored.

Consequently, it would be desirable to have a method and system of directory organization which significantly reduces the storage required for address tags within a directory.

SUMMARY OF THE INVENTION

It is therefore one object of the present invention to provide an improved method and system for storing data.

It is another object of the present invention to provide an improved method and system for storing address tags.

It is yet another object of the present invention to provide an improved method and system for storing address tags within a directory by distributing address tag bits over the directory elements, thereby reducing the storage required for the address tags.

The foregoing objects are achieved as is now described. An efficient method and system within a data processing system for storing address tags are disclosed, which include a tag directory having a plurality of congruence classes, wherein each congruence class is arranged as a tree-like data structure. A portion of an address tag common to a plurality of address tags is stored in an entry within a node at a first level of a tree-like data structure corresponding to a congruence class of the directory. Portions of the plurality of address tags are stored in a node at a subsequent level of the tree-like data structure, such that all of the plurality of address tags share in common the portion stored in the entry within the node at the first level. Since a portion common to a plurality of address tags is stored only once, the memory space required to store the plurality of address tags is reduced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
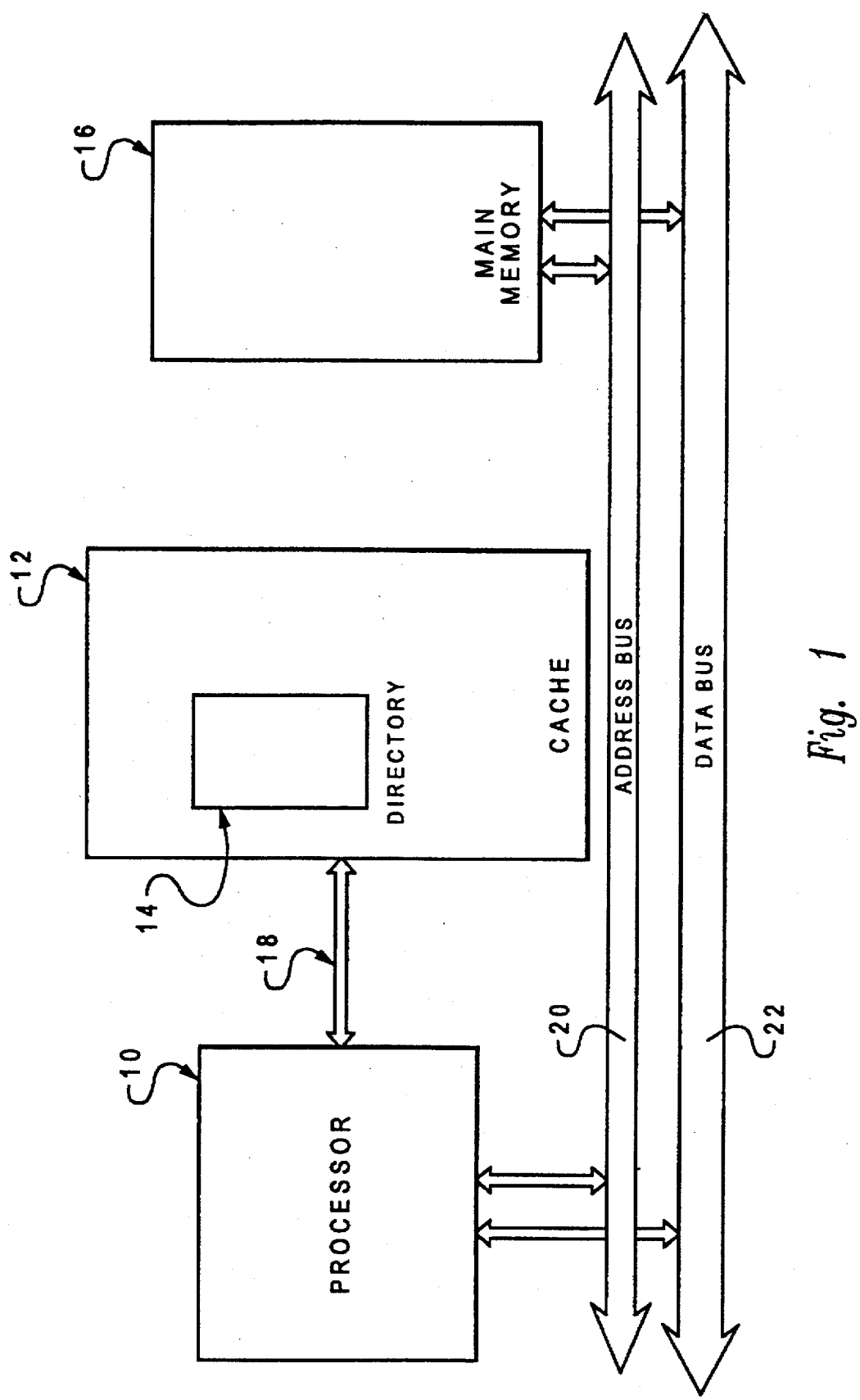
FIG. 1 depicts a block diagram of a data processing system in which a directory employing the method and system of the present invention is utilized as a cache directory.

With reference now to the figures and in particular with reference to FIG. 1, there is illustrated a block diagram of a data processing system utilizing a cache directory organized according to the method and system of the present invention. Cache 12 is a small amount of fast, expensive, zero wait state memory used to store a copy of frequently accessed instructions and data from main memory 16. When processor 10 operates using data and instructions stored within cache 12, processor performance is enhanced since the number of wait states interposed during a memory access is reduced. When processor 10 requests data from cache 12 via local bus 18, cache 12 scans tag bit entries within directory 14 to determine if a copy of the requested data resides within cache 12.

If the requested data is not in cache 12, then a cache miss occurs and the data request is forwarded to main memory 16 via address bus 20. Processor 10 then reads data from main memory 16 via data bus 22. Since the requested data is likely to utilized again by processor 10, a copy of the data is stored within cache 12. Directory 14 is then updated to reflect the new entries stored in cache 12.

Figure 2:
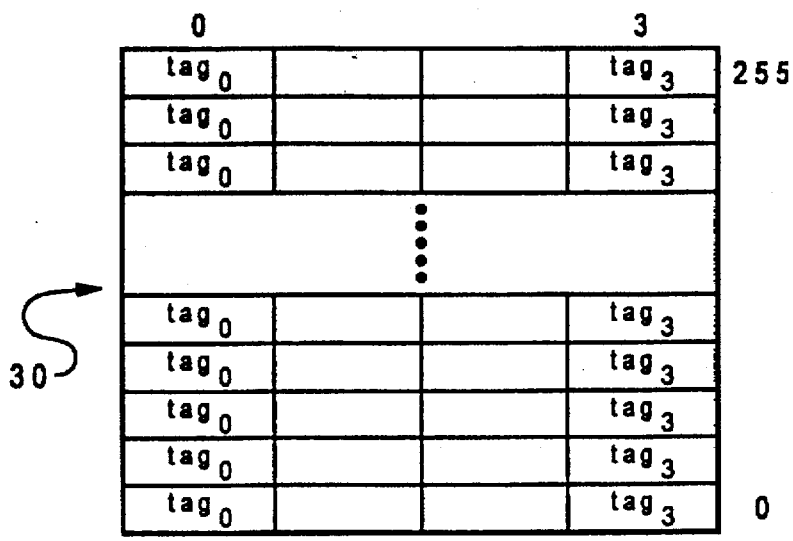
FIG. 2 illustrates the structure of a conventional four-way set associative directory.

Referring now to FIG. 2 there is depicted directory 30, which is organized as a conventional four-way set associative directory. As is well known in the art, addresses mapping to a congruence class within directory 30 can be stored in any of the four ways within that congruence class.

Although a four-way set associative directory provides enhanced performance compared with a direct mapped cache, since a cache miss does not require replacement of all elements within a congruence class, a four-way set associative directory comes at increased cost because of the larger memory space required. Since each entry within directory 30 must store all tag bits of the address which it indexes, the storage required for the tag bits becomes large as the number of congruence classes increases. For example, assuming that directory 30 indexes a 256 KB cache and there are 28 tag bits per entry, the total number of tag bits stored within directory 30 is 4 * 28 * 256=28,672 bits.

Figure 3:
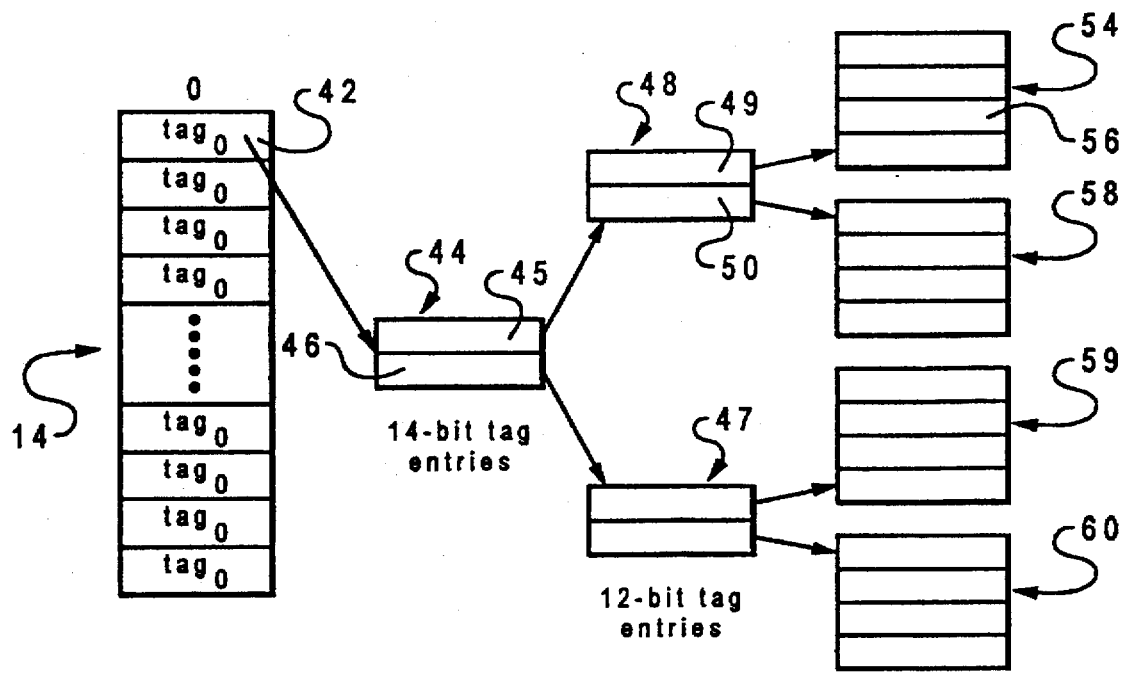
FIG. 3 depicts a directory organized according to the method and system of the present invention.

With reference now to FIG. 3, there is depicted a representation of the structure of directory 14 of FIG. 1, which is organized according to the distributed directory tag scheme employed by the method and system of the present invention. The present invention takes advantage of the locality of addresses indexed by the directory 14. Since many of the addresses, and therefore address tags, share the same high order bits, the high order bits shared in common by entries within the directory are stored just once, thereby reducing the total number of tag bits stored in the directory 14.

In a directory organized according to the present invention, each congruence class within the directory is arranged as an m-ary tree, where m is a positive integer. In the preferred embodiment illustrated in FIG. 3, each congruence class 42 within directory 14 is arranged as a binary tree comprising nodes 44, 47 and 48 and leaf nodes 54, 58, 59, and 60. A leaf node is simply a node, having a plurality of entries (leaves), to which no subsequent nodes are linked.

Figure 4:
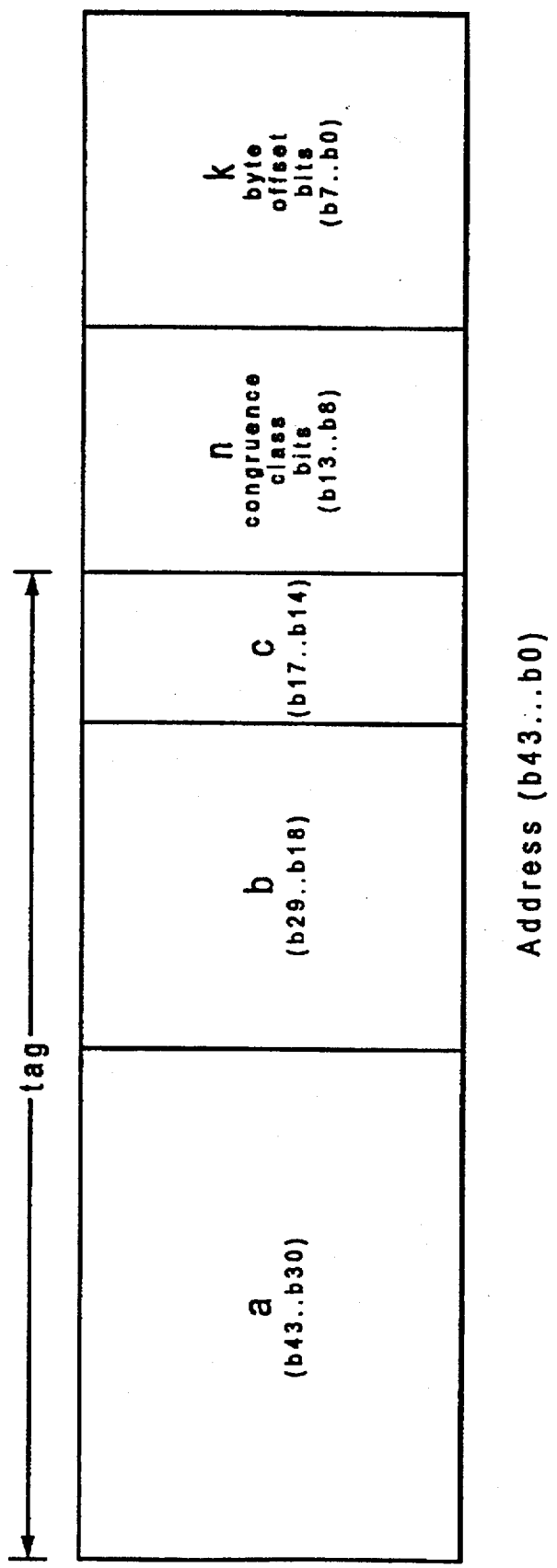
FIG. 4 illustrates the division of an address within a data processing system utilizing the method and system of the present invention.
Figure 5A:
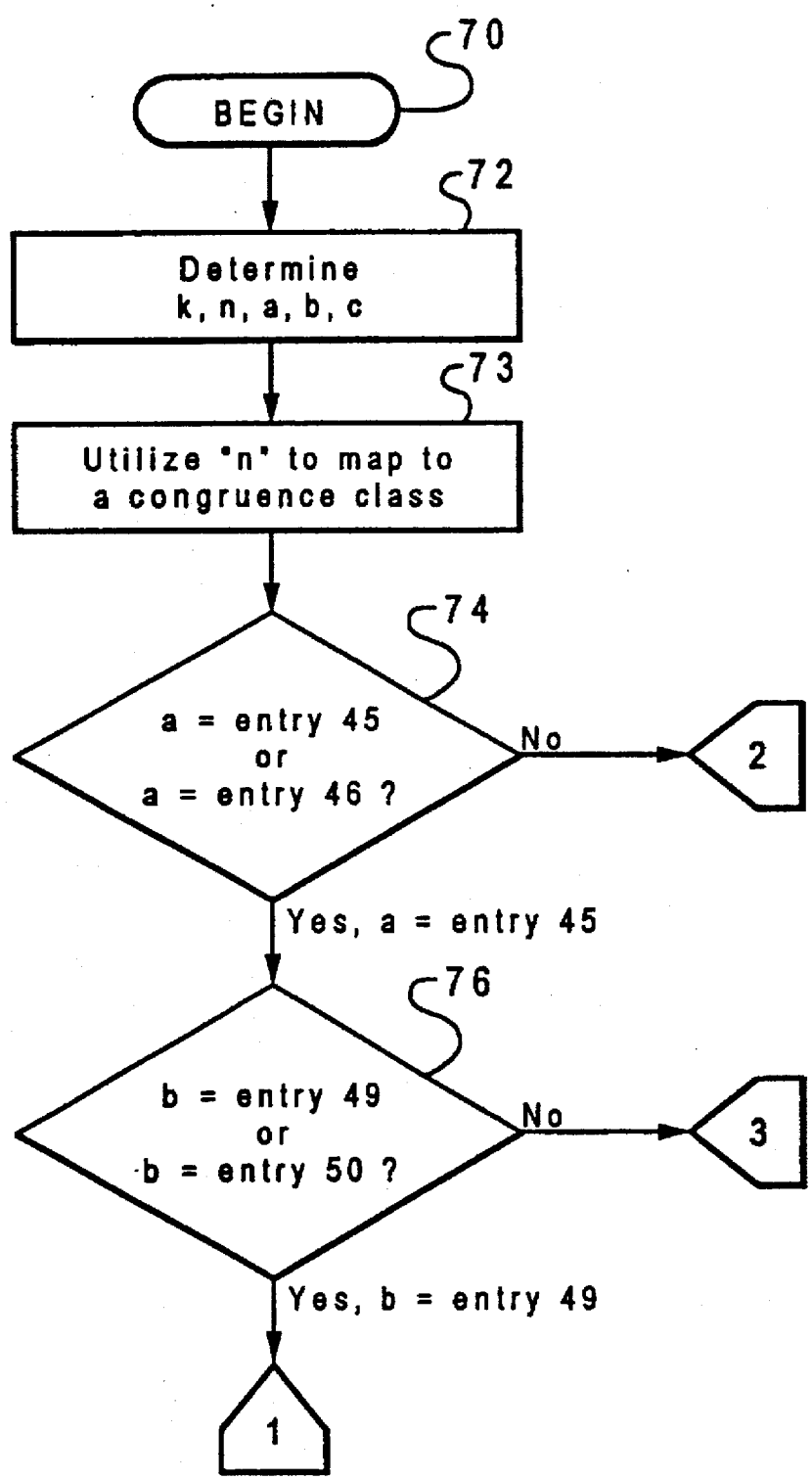
FIGS. 5A–5D together comprise a flowchart illustrating a process for managing a directory organized according to the method and system of the present invention.
Figure 5B:
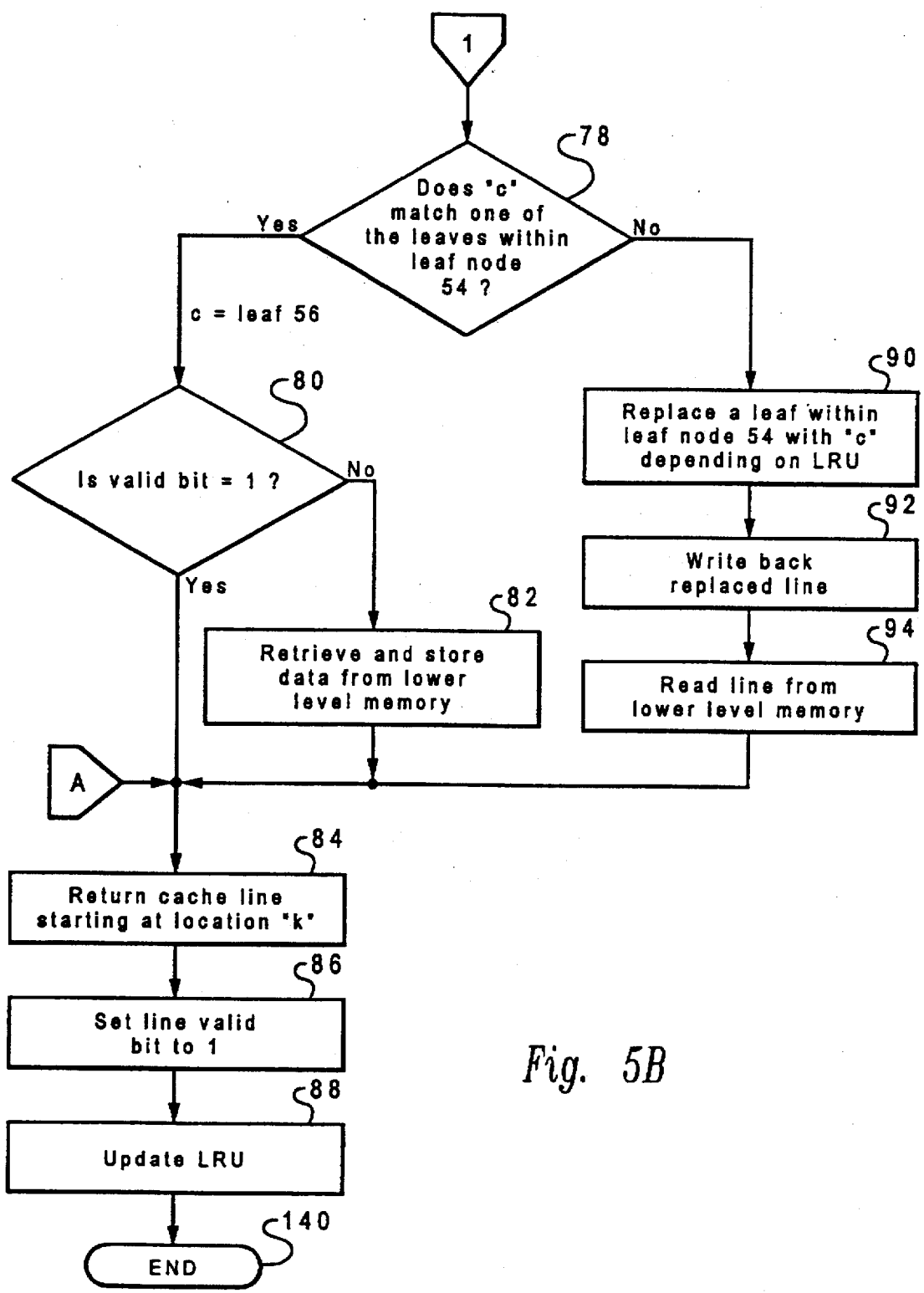
Figure 5C:
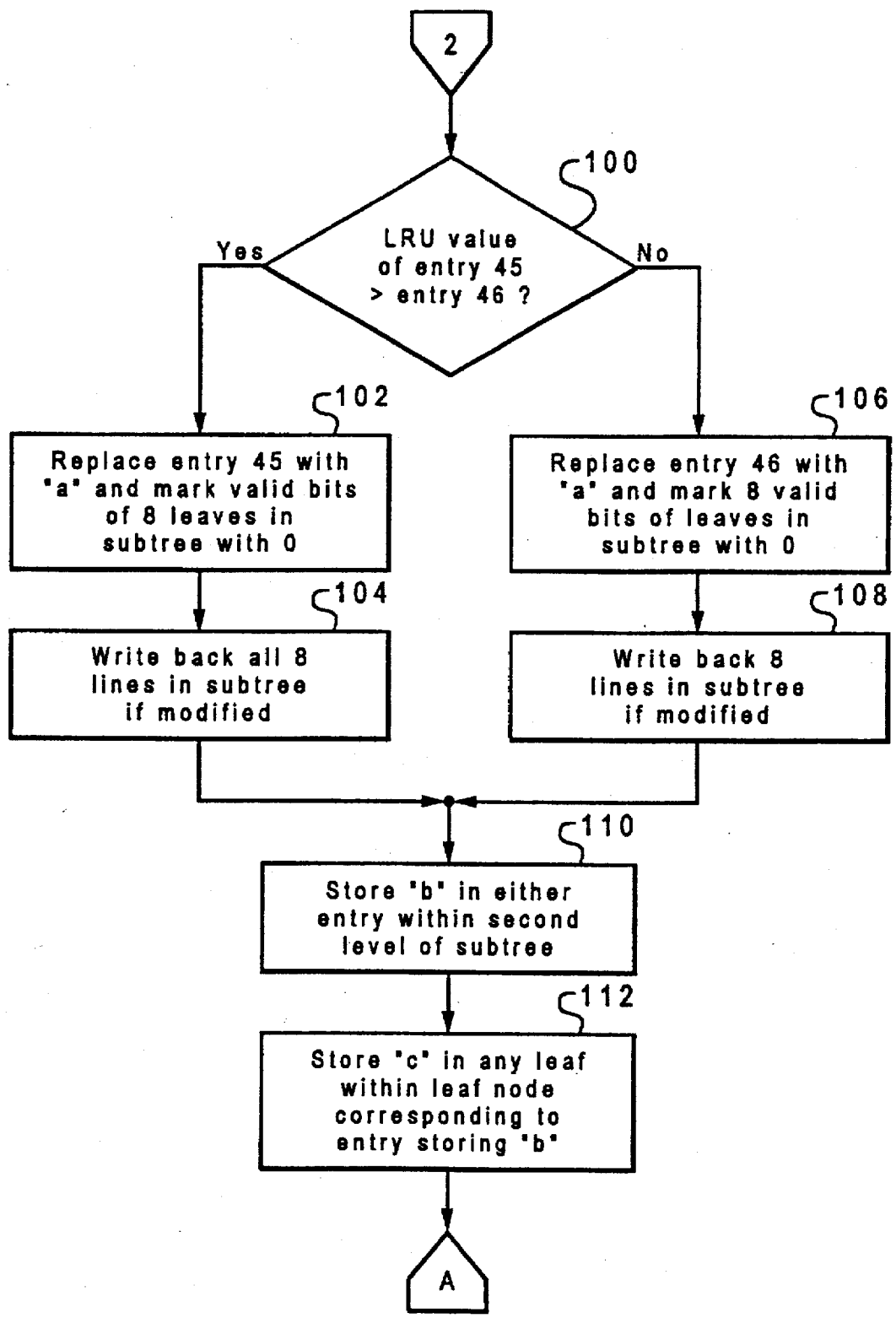
Figure 5D:
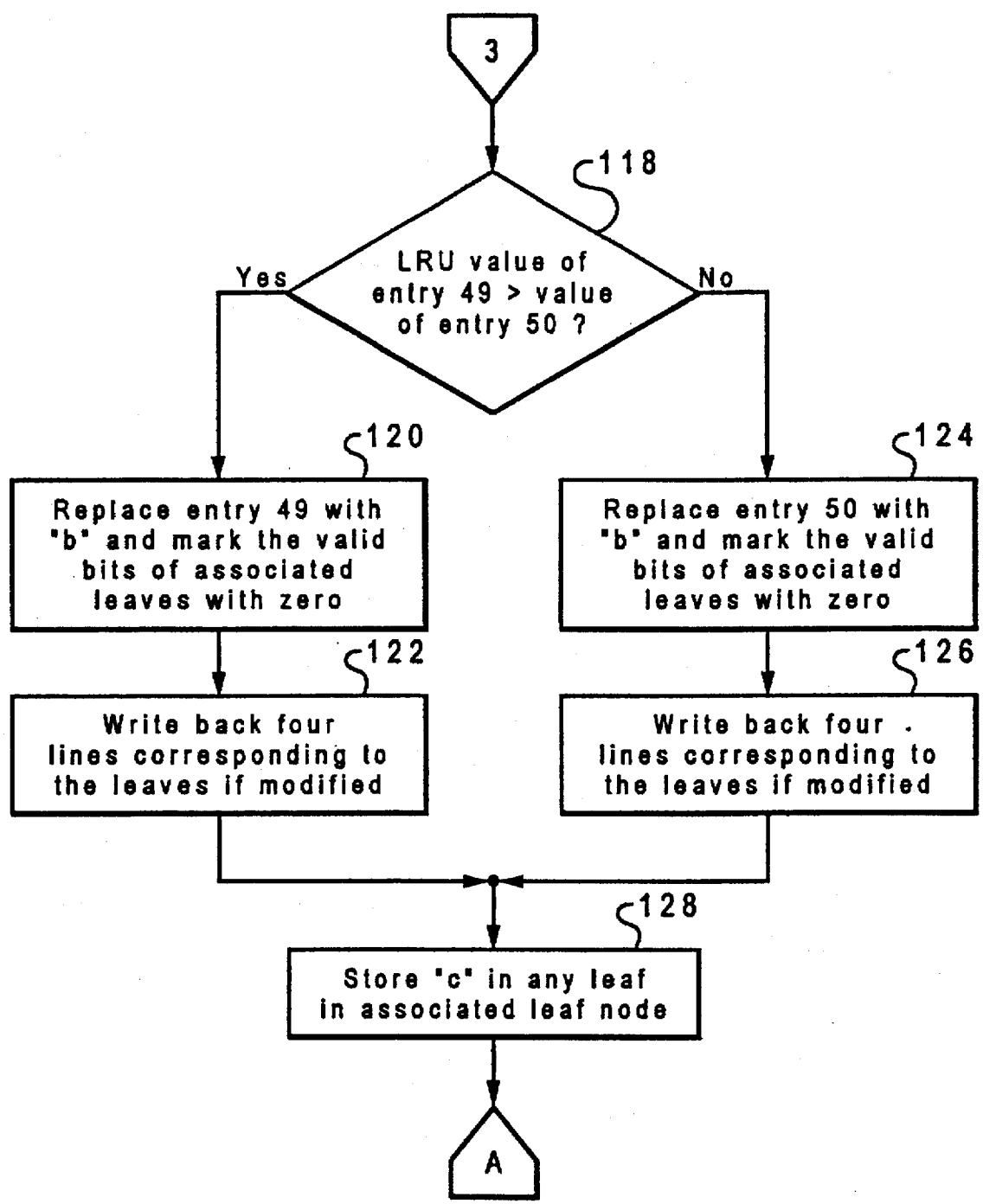

When processor 10 requests data from cache 12, the data address is mapped to congruence class 42 in a manner well-known in the art. However, in contrast to conventional tag storage schemes, the address tag is then divided into three portions a, b, and c, as illustrated in FIG. 4. FIG. 3 illustrates an embodiment in which a 30 bit address tag is stored with the 14 bits of tag portion a in one of the two entries within node 44, the 12 bits of tag portion b within one of the entries in node 48, and the 4 bits of tag portion c within one of the leaves within leaf node 54.

The storage required for address tags within directory 14 is reduced since the 4 address tags, for which tag portions c are stored in leaf node 54, share in common tag portion b stored in entry 49 of node 48. Similarly, all addresses indexed by leaf nodes 54 and 58 share in common tag portion a stored in entry 45. Since the tag portion specific to only a single address is stored within leaves of the binary tree, redundant storage of common tag bits is eliminated and the storage required for the tag directory is reduced. The number of bits within each portion of the address tag is arbitrary, however, and may differ between systems in order to obtain an optimal balance between performance and cost. Although the memory space required for directory 14 decreases as the number of tag bits stored within entries at higher levels of the binary tree increases, such arrangements entail a performance penalty since larger numbers of entries are cast out on a cache miss.

As an example of the storage savings resulting from utilizing the distributed directory tag scheme of the present invention, consider again the cache example used in conjunction with FIG. 2. In that example, a four-way set associative directory, having 1,024 total entries, was used to store 28-bit address tags. Assuming the same number of total entries in directory 14 of FIG. 3, directory 14 would comprise 64 congruence classes 42 since each congruence class 42 stores 16 entries. Thus, directory 14 would require only 8,960 bits (i.e., (2*14+4*12+16*4)*64=8,960 bits) to store the same information that was stored within directory 30, a savings of almost 70 percent.

Referring now to FIGS. 5A–5D, there is depicted a flowchart of the process utilized to manage a tag directory organized according to the method and system of the present invention. Although the tag directory could be organized with any number of levels within the m-ary trees associated with the congruence classes, the process illustrated in FIGS. 5A–5D is utilized to manage a tag directory having a structure like that depicted in FIG. 3. As illustrated, the process begins in block 70 and thereafter proceeds to block 72, which depicts determining from an address request portions a, b, and c of the address tag, congruence class bits n, and byte offset k, which specifies a byte within the cache line. Thereafter, the process proceeds to block 73, which illustrates utilizing n to map to congruence class 42 within tag directory 14. The process then proceeds to block 74, which depicts determining if a, bits 43–30 of the address, matches either of entries 45 or 46 within node 44. Assuming a matches the tag portion stored within entry 45, the process determines if b, bits 29–18 of the address, matches either entry 49 or entry 50 of node 48, the node linked to entry 45 of node 44.

Assuming tag portion b matches entry 49, the process proceeds to block 78, which depicts an associative search of the four leaves within leaf node 54. If c matches leaf 56, a hit has occurred and the process proceeds to block 80. Block 80 represents determining from the valid bit associated with leaf 56 whether the data stored in the cache is valid. If the valid bit is set to 1, the data in the cache associated with the address request is valid, and the process proceeds to block 84. However, if the valid bit is set to 0, the process proceeds to block 82, which represents updating the cache with data from a lower level of memory, which could be either a lower level cache or main memory. Once it has been determined that the data is valid or the invalid data has been updated, the process proceeds to block 84 which depicts returning the cache line data beginning with the byte specified by byte offset k. Thereafter, the process proceeds to block 86, which illustrates setting the valid bit associated with leaf 56 to 1.

The process then proceeds to block 88, which illustrates updating the LRU bits. Storage at every level in directory 14 has $\log_2 i_L$ LRU bits, where $i_L$ is the number of entries at level L, provided that $i_L$ is a power of two. If the number of entries at a level is not a power of 2, the level has a number of LRU bits equal to the next integer greater than $\log_2 i_L$. Thus, for directory 14 of FIG. 3, entries at the first level of the binary tree have one LRU bit, entries at the second level have two LRU bits, and leaves have four LRU bits. Updating the LRU values entails setting the LRU bits of entries and leaves matching the address tag to 0, and incrementing the LRU value of all other entries and leaves. The LRU values are not incremented beyond a ceiling value corresponding to the number of elements at a given level.

Returning to block 78, if tag portion c does not match any of the leaves within leaf node 54, a miss occurs at the third level. The process then proceeds to block 90, which depicts replacing the leaf within leaf node 54 having the highest LRU value with tag portion c. Thereafter, the process proceeds to blocks 92 and 94, which illustrate writing back the replaced line and reading the line specified by the address request from a lower level memory. Thereafter, the process proceeds to blocks 84, 86, and 88, which were described above.

Returning to block 74, a first level miss will now be described. If tag portion a matches neither entry 45 or 46 of node 44, the process proceeds from block 74 to block 100, which depicts examining the LRU values of entries 45 and 46. If entry 45 has the highest LRU value, the process proceeds to block 102, which illustrates replacing entry 45 with tag portion a and marking the valid bits of all eight leaves in the sub-tree of entry 45 with 0. Thereafter, as depicted in block 104, the eight lines in the sub-tree of entry 45 are written back if they have been modified. Similar steps are followed in blocks 106 and 108 if the LRU value of entry 46 is greater than that of entry 45.

Thereafter, the process proceeds from either block 104 or block 108 to block 110, which depicts storing tag portion b in either entry of the second level node linked to the entry replaced with tag portion a. The process then proceeds to block 112, which illustrates storing tag portion c in any leaf within the leaf node linked to the entry storing tag portion b. Thereafter, the process proceeds to blocks 84, 86, and 88, whose operation has been described.

Returning to block 76, a second level miss will be described. If in block 76, tag portion b matches neither entry 49 or entry 50, the process proceeds to block 118. Block 118 illustrates determining whether the LRU value of entry 49 is greater than the LRU value of entry 50. If the LRU value of entry 49 is greater than that of entry 50, the process proceeds to block 120, which depicts replacing entry 49 with tag portion b and marking the valid bits of the leaves in the associated leaf node to 0. The process then proceeds to block 122, which illustrates writing back the four cache lines corresponding to the leaves within the leaf node associated with entry 49 if they have been modified. If, however, the LRU value of entry 50 is greater than that of entry 49, the process proceeds from block 118 to block 124. Blocks 124 and 126 depict performing similar operations as blocks 120 and 122, but with respect to leaves within leaf node 58 linked to entry 50.

The process proceeds from either block 122 or block 126 to block 128, which illustrates storing tag portion c in any leaf of the leaf node associated with the entry storing tag portion b. The process then proceeds to blocks 84, 86, and 88, which were described above. Thereafter, the process terminates at block 140.

It is apparent from the description of the process illustrated in FIGS. 5A–5D that the miss penalty of a directory organized according to the method of the present invention is high. For example, in the configuration depicted in FIG. 3, eight entries are cast out for a first level miss, compared with one entry cast out for a miss within the conventional set associative directory depicted in FIG. 2. However, the increased set associativity of the present invention compensates for the miss penalty when addresses are localized, resulting in little degradation in overall performance. Any loss in performance compared with conventional directory organizations is negligible compared to the cost savings gained due to the decrease in the high-speed memory required to store the address tags.

Although the present invention has been described with respect to a cache directory, one skilled in the art will recognize that the directory organization of the present invention is also well-suited for use in other directories, such as multiprocessor memory directories and router directories. In addition, one skilled in the art will recognize that the present invention is not limited to directories having congruence classes arranged as binary trees, but that the present invention encompasses directories having congruence classes arranged as m-ary trees, where m is a positive integer.

While the invention has been particularly shown and described with reference to a preferred embodiment, it will be understood by those skilled in the art that various changes in form and detail may be made therein without departing from the spirit and scope of the invention.

We claim:

1. A computer readable media containing an address tag directory, comprising:

a plurality of congruence classes, wherein each congruence class among said plurality of congruence classes is arranged in a tree-like data structure including:

a first-level node including first and second first-level entries, wherein said first first-level entry stores only a first tag portion common to a first plurality of address tags and said second first-level entry stores only a first tag portion common to a second plurality of address tags;

a first second-level node including a plurality of second-level entries, wherein each of said plurality of second-level entries in said first second-level node stores a second address tag portion common to address tags within a respective one of a corresponding plurality of subsets of said first plurality of address tags, wherein all address tags in all of said plurality of subsets of said first plurality of address tags share in common said first tag portion stored in said first first-level entry; and a second second-level node including a plurality of second-level entries, wherein each of said plurality of second-level entries in said second second-level node stores a second address tag portion common to address tags within a respective one of a corresponding plurality of subsets of said first plurality of address tags, wherein all address tags in all of said plurality of subsets of said second plurality of address tags share in common said first tag portion stored in said second first-level entry.

2. The computer readable media containing an address tag directory of claim 1, wherein said address tag directory is a cache directory.

3. The computer readable media containing an address tag directory of claim 1, and further comprising:

means for traversing a tree-like data structure corresponding to a selected congruence class utilizing a search address tag in order to determine if a matching address tag resides in said address tag directory;

responsive to a determination that a matching address tag does not reside in said address tag directory, means for invalidating an address tag portion stored in a selected entry among a plurality of entries within a node at a highest level in said tree-like data structure corresponding to said selected congruence class at which no match exists between address tag portions stored in said node and a corresponding portion of said search address tag; and means for invalidating all entries within each node in a subtree of said selected entry.

4. The computer readable media containing an address tag directory of claim 1, and further comprising:

means for storing unmatched portions of said search address tag in said tree-like data structure corresponding to said selected congruence class.

5. The computer readable media containing an address tag directory of claim 1, said tree-like data structure further comprising:

a plurality of third-level nodes, each of said plurality of third level nodes being associated with a respective one of said plurality of second-level entries in said first and said second second-level nodes, wherein third-level nodes associated with second-level entries in said first second-level node each store a third address tag portion of an address tag in said first plurality of address tags, and wherein third-level nodes associated with second-level entries in said second second-level node each store a third address tag portion of an address tag among said second plurality of address tags, all of said third address tag portions stored in a single one of said plurality of third-level nodes being different from each other.

6. The computer readable media containing an address tag directory of claim 5, wherein each of said plurality of third-level nodes is arranged as a leaf node that stores third address tag portions of m address tags in an m-way associative set of m leaves.

7. A method for managing address tags within a data processing system including an address tag directory, wherein each congruence class within said directory is arranged as a tree-like data structure having a plurality of levels, said method comprising:

storing a first tag portion common to a first plurality of address tags in a first first-level entry within a first-level node of said tree-like data structure corresponding to selected congruence class of said directory;

storing a first tag portion common to a second plurality of address tags in a second first-level entry within said first-level node;

storing, within each of a plurality of second-level entries in a first second-level node of said tree-like data structure, a second address tag portion common to address tags within a respective one of a corresponding plurality of subsets of said first plurality of address tags; and storing, within each of a plurality of second-level entries in a second second-level node of said tree-like data structure, a second address tag portion common to address tags within a respective one of a corresponding plurality of subsets of said second plurality of address tags.

8. The method of claim 7, said tree-like data structure further comprising a plurality of third-level nodes, each of said plurality of third level nodes being associated with a respective one of said plurality of second-level entries in said first and said second second-level nodes, said method further comprising:

storing a third address tag portion of one of said first plurality of address tags in each third-level node associated with one of said plurality of second-level entries in said first second-level node; and storing a third address tag portion of one of said second plurality of address tags in each third-level node associated with one of said plurality of second-level entries in said second second-level node.

9. The method of claim 7, and further comprising:

in response to receipt of a search address including a search address tag and congruence class selection bits, selecting a congruence class within said directory utilizing said congruence class selection bits;

traversing a tree-like data structure corresponding to said selected congruence class utilizing said search address tag to determine if a matching address tag resides in said address tag directory;

in response to a determination that said search address tag does not reside in said directory, invalidating an address tag portion stored in a selected entry among a plurality of entries within a node at a highest level in said tree-like data structure corresponding to said selected congruence class at which no match exists between address tag portions stored in said node and a corresponding portion of said search address tag; and means for invalidating all entries within each node in a subtree of said selected entry.

10. The method of claim 9, and further comprising:

storing unmatched portions of said address tag in said tree-like data structure corresponding to said selected congruence class.

\* \* \* \* \*